(12) United States Patent
Kudoh

(10) Patent No.: US 8,625,205 B2
(45) Date of Patent: Jan. 7, 2014

(54) ZOOM TYPE LENS BARREL AND IMAGE PICKUP APPARATUS

(75) Inventor: Tomoyuki Kudoh, Tokyo (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/364,692

(22) Filed: Feb. 2, 2012

(65) Prior Publication Data

US 2012/0200941 A1 Aug. 9, 2012

(30) Foreign Application Priority Data

Feb. 3, 2011 (JP) .................................. 2011-021613

(51) Int. Cl.
*G02B 15/14* (2006.01)

(52) U.S. Cl.
USPC ............ 359/703; 359/694; 359/700; 359/826

(58) Field of Classification Search
USPC .................. 359/676–693, 694–706, 823–826
See application file for complete search history.

(56) References Cited

U.S. PATENT DOCUMENTS

| 4,822,153 | A | * | 4/1989 | Tomori et al. ................. 359/700 |
| 6,829,103 | B2 | * | 12/2004 | Kobayashi et al. ........... 359/700 |
| 2009/0128931 | A1 | * | 5/2009 | Matsumoto .................... 359/823 |

FOREIGN PATENT DOCUMENTS

| JP | 2006-078537 A | 3/2006 |
| JP | 2007-114531 A | 5/2007 |

\* cited by examiner

*Primary Examiner* — Ricky Mack
*Assistant Examiner* — Gary O'Neill
(74) *Attorney, Agent, or Firm* — Rossi, Kimms & McDowell LLP

(57) ABSTRACT

A lens barrel which can increase the relative movement interval of lens units in the direction of an optical axis without increasing the dimension of a translating cylinder, which inhibits the rotation of the lens units, in the direction of the optical axis. The movement of a second lens unit holding second group lenses is switched from linear guide by a first translating guide unit to linear guide by a second translating guide unit when the second lens unit moves in a direction relatively away from a first lens unit holding first group lenses.

6 Claims, 6 Drawing Sheets

ZOOM TYPE LENS BARREL AND IMAGE PICKUP APPARATUS

BACKGROUND OF THE INVENTION

1. Field of the Invention

The present invention relates to a zoom type lens barrel mounted on an image pickup apparatus such as a digital camera, and an image pickup apparatus having the lens barrel.

2. Description of the Related Art

Conventionally, in a zoom-type lens barrel mounted on an image pickup apparatus such as a digital camera, a plurality of lens units holding lenses are moved in the direction of an optical axis by rotation of a cam cylinder, while the movement of the lens units in the rotational direction is inhibited by a translating cylinder.

In recent years, with the demand for an increase in shooting magnification, the number of lens units have increased, and the length over which lens units are extended have increased, and thus the size of a lens barrel tends to increase. On the other hand, there has been the demand for slimming down of digital cameras, and accordingly, the dimension of a lens barrel in the direction of an optical axis when the lens barrel is retracted has been required to be reduced to the extent possible.

Accordingly, for example, there has been proposed a lens barrel in which cam grooves are provided on an inner peripheral side and an outer peripheral side of one cam cylinder, and a plurality of lens units following the respective cam grooves are relatively moved in the direction of an optical axis to change shooting magnifications (see Japanese Patent Laid-Open Publication (Kokai) No. 2006-078537). Also, there has been proposed a lens barrel in which a front set of lens units and a rear set of lens units are cam-engaged with and held on respective cam grooves formed on cam members in the third row (see Japanese Patent Laid-Open Publication (Kokai) No. 2006-078537).

Further, there has been proposed a method by which followers are provided before and after a lens unit in the direction of an optical axis, and the followers are moved on the same cam cylinder with movement of a zoom lens to ensure movement strokes of the lens unit (see Japanese Patent Laid-Open Publication (Kokai) No. 2007-114531).

Further, according to both Japanese Patent Laid-Open Publication (Kokai) No. 2006-078537 and Japanese Patent Laid-Open Publication (Kokai) No. 2007-114531, if relative movement intervals of lens units in the direction of an optical axis are increased so as to increase the shooting magnification, the dimension of a translating cylinder, which inhibits the rotation of the lens units, in the direction of the optical axis will be increased. As a result, the dimension of a lens barrel in the direction of the optical axis when the lens barrel is retracted will be increased, which inhibits slimming-down of an image pickup apparatus.

SUMMARY OF THE INVENTION

The present invention provides a lens barrel capable of increasing the relative movement interval of lens units in the direction of an optical axis without increasing the dimension of a translating cylinder, which inhibits the rotation of the lens units, in the direction of the optical axis, and an image pickup apparatus having the lens barrel.

Accordingly, a first aspect of the present invention provides a lens barrel comprising a first lens unit configured to hold first group lenses, a second lens unit configured to hold second group lenses, a first cam member with which the first lens unit is cam-engaged and which is configured to rotate to move the first lens unit in a direction of an optical axis, a second cam member with which the second lens unit is cam-engaged and which is configured to rotate to move the second lens unit in the direction of the optical axis, a translating cylinder configured to inhibit rotation of the first lens unit, a first translating guide unit configured to be provided between the first lens unit and the second lens unit, and linearly guide the second lens unit in the direction of the optical axis with rotation of the second lens unit being inhibited, and a second translating guide unit configured to be provided between the second lens unit and the translating cylinder, and linearly guide the second lens unit in the direction of the optical axis with rotation of the second lens unit being inhibited, wherein the movement of the second lens unit is switched from linear guide by the first translating guide unit to linear guide by the second translating guide unit when the second lens unit moves in a direction relatively away from the first lens unit.

Accordingly, a second aspect of the present invention provides an image pickup apparatus having a zoom-type lens barrel that changes shooting magnifications by moving in the direction of the optical axis between a shooting position and a retracting position, comprising, as the lens barrel, a lens barrel as described above.

According to the present invention, the relative movement interval of lens units in the direction of the optical axis can be increased without increasing the dimension of the translating cylinder, which inhibits the rotation of the lens units, in the direction of the optical axis. Therefore, the shooting magnification of the lens barrel can be increased, while slimming down of the image pickup apparatus can be realized by reducing the dimension of the lens barrel in the direction of the optical axis when the lens barrel is retracted.

Further features of the present invention will become apparent from the following description of exemplary embodiments (with reference to the attached drawings).

DESCRIPTION OF THE EMBODIMENTS

The present invention will now be described in detail with reference to the drawings showing an embodiment thereof.

Figure 1:
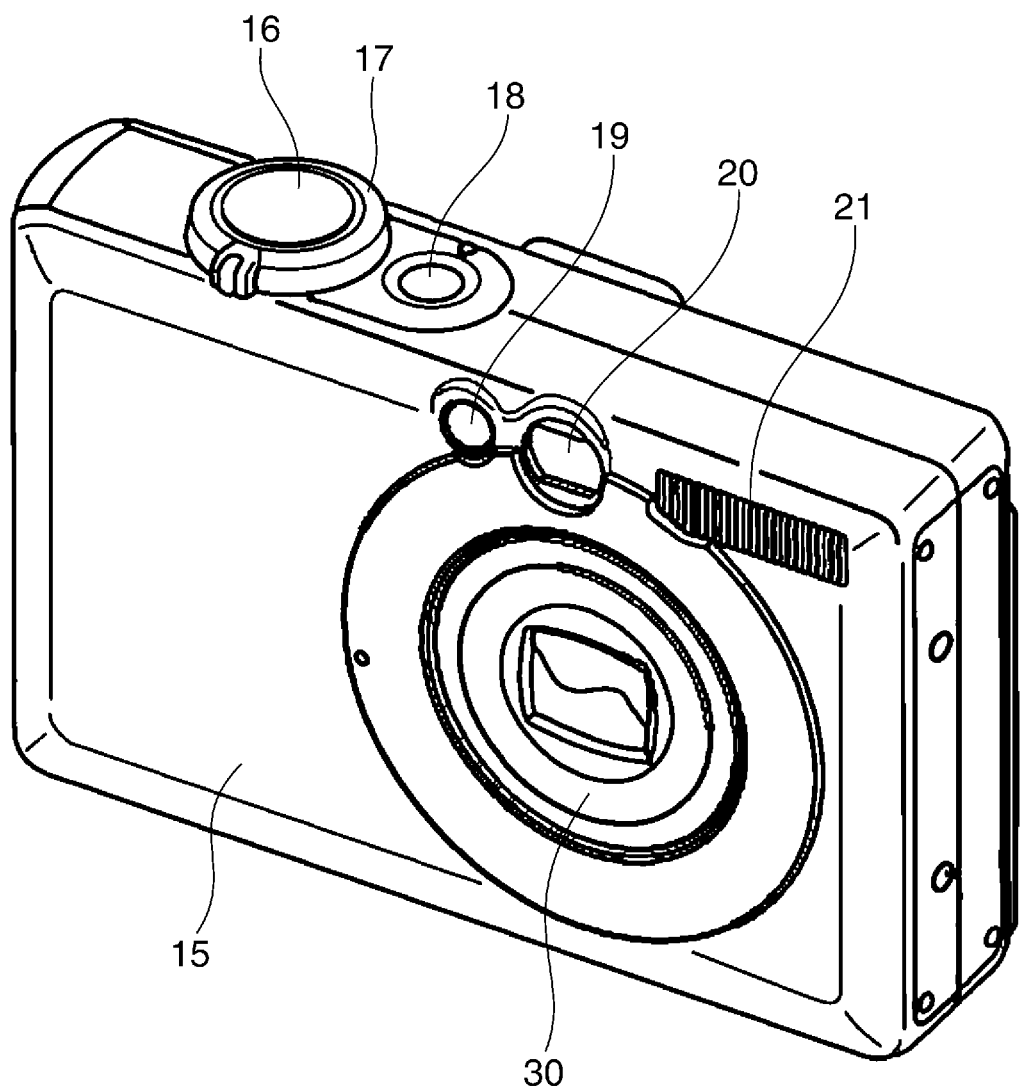
FIG. 1 is a perspective view showing the appearance of a digital camera, which is an exemplary image pickup apparatus according to the present invention, as viewed from the front.
Figure 2:
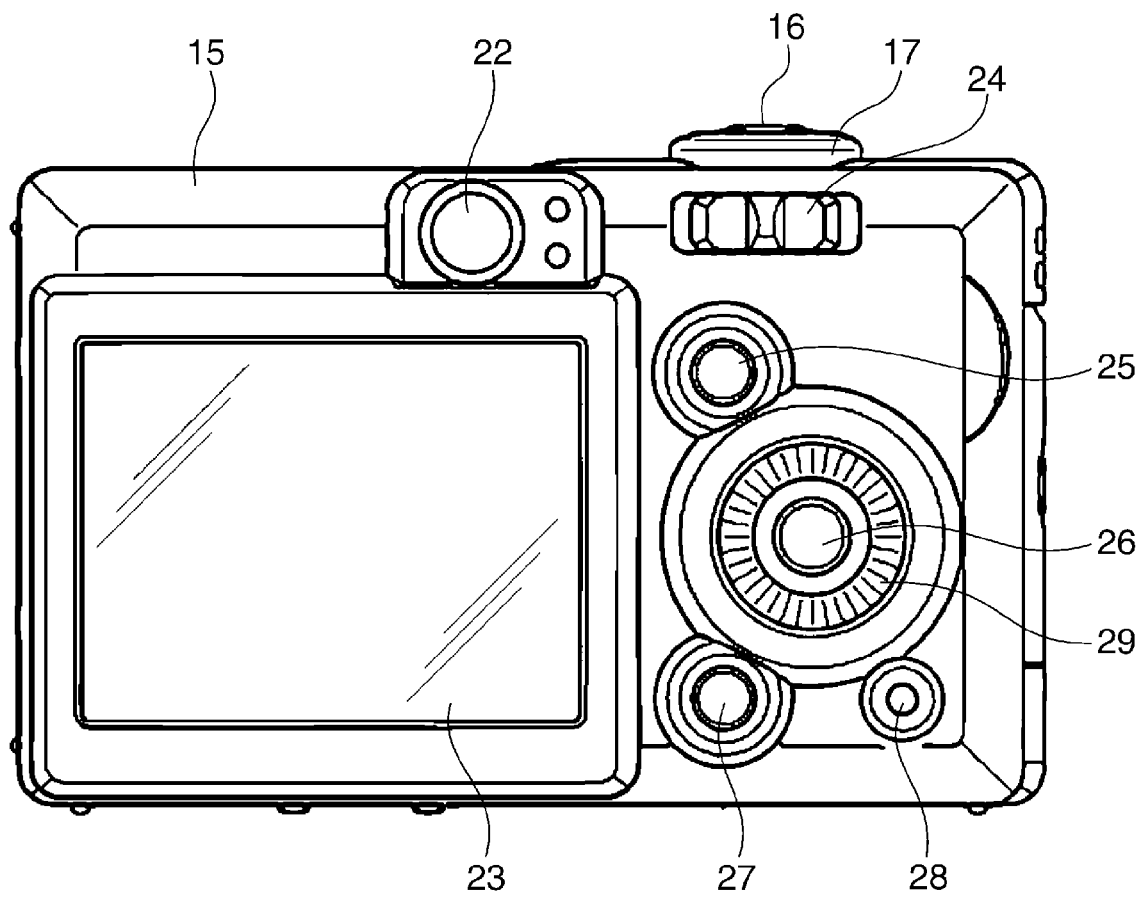
FIG. 2 is a perspective view showing the digital camera in FIG. 1 as viewed from the rear.

FIG. 1 is a perspective view showing the appearance of a digital camera, which is an exemplary image pickup apparatus according to the present invention, as viewed from the front, and FIG. 2 is a perspective view showing the digital camera in FIG. 1 as viewed from the rear.

Referring to FIGS. 1 and 2, the digital camera 15 according to the present embodiment is configured such that a finder 20, an auxiliary light source 19 for use in photometry and ranging, a strobe 21, and a lens barrel 30 are disposed in front. The lens barrel 30 is of a zoom type which changes shooting magnifications by moving in the direction of an optical axis between a shooting position and a retracting position.

A release button 16, a power switch button 18, and a zoom switch 17 are disposed on the top of the digital camera 15. As shown in FIG. 2, operation buttons 24 to 29, a display 23 such as an LCD, and a finder eyepiece 22 are disposed on the back of the digital camera 15.

Figure 3:
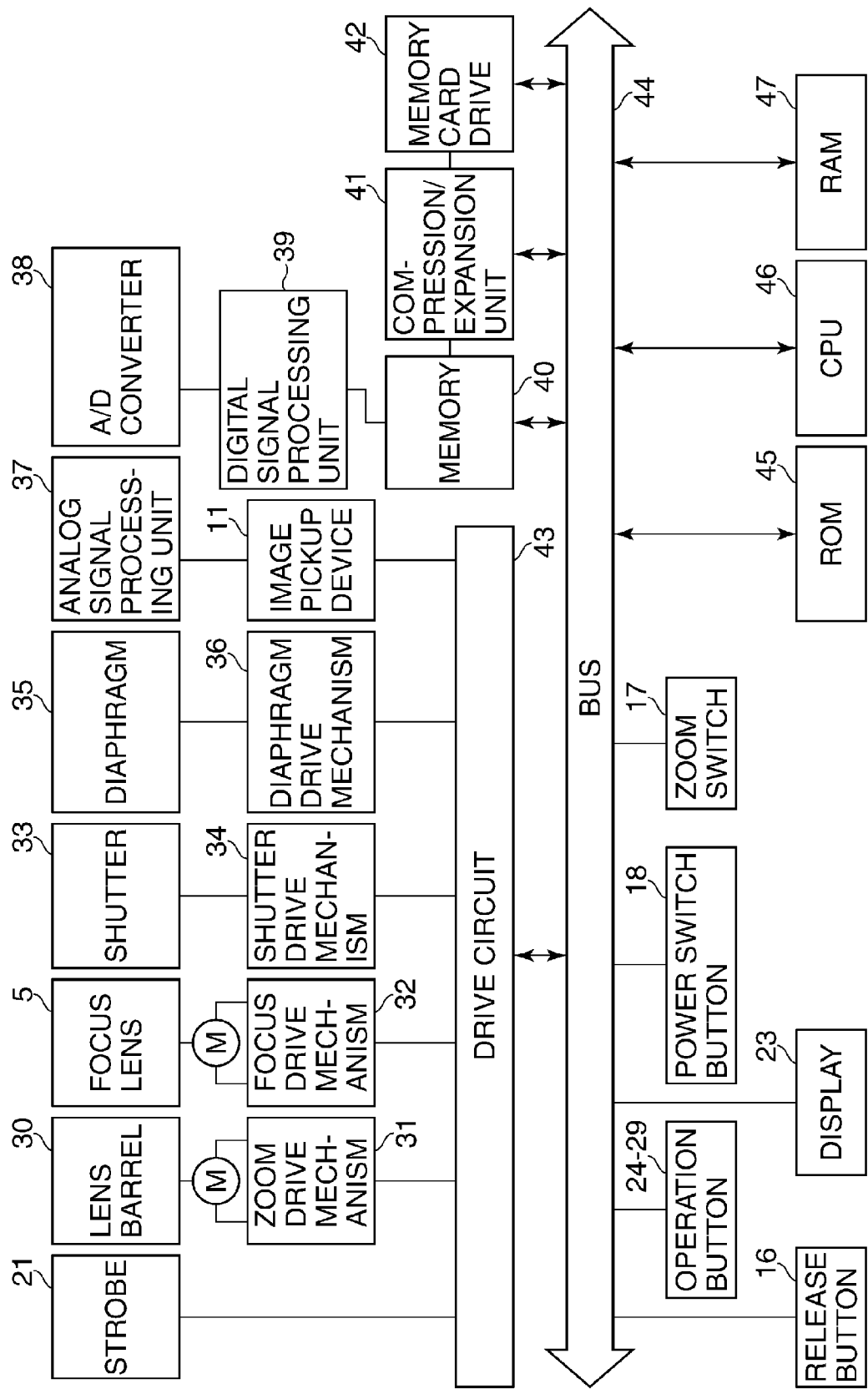
FIG. 3 is a block diagram useful in explaining a control system of the digital camera.

FIG. 3 is a block diagram useful in explaining a control system of the digital camera 15. As shown in FIG. 3, a CPU 46, a ROM 45, a RAM 47, a release button 16, and operation buttons 24 to 29, and a display 23 are connected to a bus 44. Also, the power switch button 18, the zoom switch 17, a memory 40, a compression/expansion unit 41, a memory card drive 42, and a drive circuit 43 are connected to the bus 44.

A zoom mechanism 31 that zoom-drives the lens barrel 30, a focus drive mechanism 32 that drives a focus lens 5, a shutter drive mechanism 34 that drives a shutter 33, and a diaphragm drive mechanism 36 that drives a diaphragm 35 are connected to a drive circuit 43.

An image pickup device 11 such as a CCD sensor or CMOS sensor and a strobe 21 are connected to the drive circuit 43. The operation of the units connected to the drive circuit 43 is controlled via the drive circuit 43 based on signals from the CPU 46.

Various control programs and others are stored in the ROM 45, and data required for various control programs is stored in the RAM 47. An analog signal processing unit 37 carries out analog processing on image data output from the image pickup device 11, and outputs the image data to an A/D converter 38.

The A/D converter 38 converts analog data taken from the image pickup device 11 into digital data, and outputs the digital data to a digital signal processing unit 39. The digital signal processing unit 39 carries out predetermined processing on the digital data obtained as a result of the conversion by the A/D converter 38, and outputs the resulting data as image data to the memory 40.

Image data stored in the memory 40 is subjected to compression processing such as JPEG or TIFF by the compression/expansion unit 41 and then output to a memory card mounted on the memory card drive 42 and stored.

Also, image data stored in the memory 40 and image data stored in the memory card drive 42 can be subjected to expansion processing by the compression/expansion unit 41 and then displayed on the display 23 via the bus 44.

Figure 4:
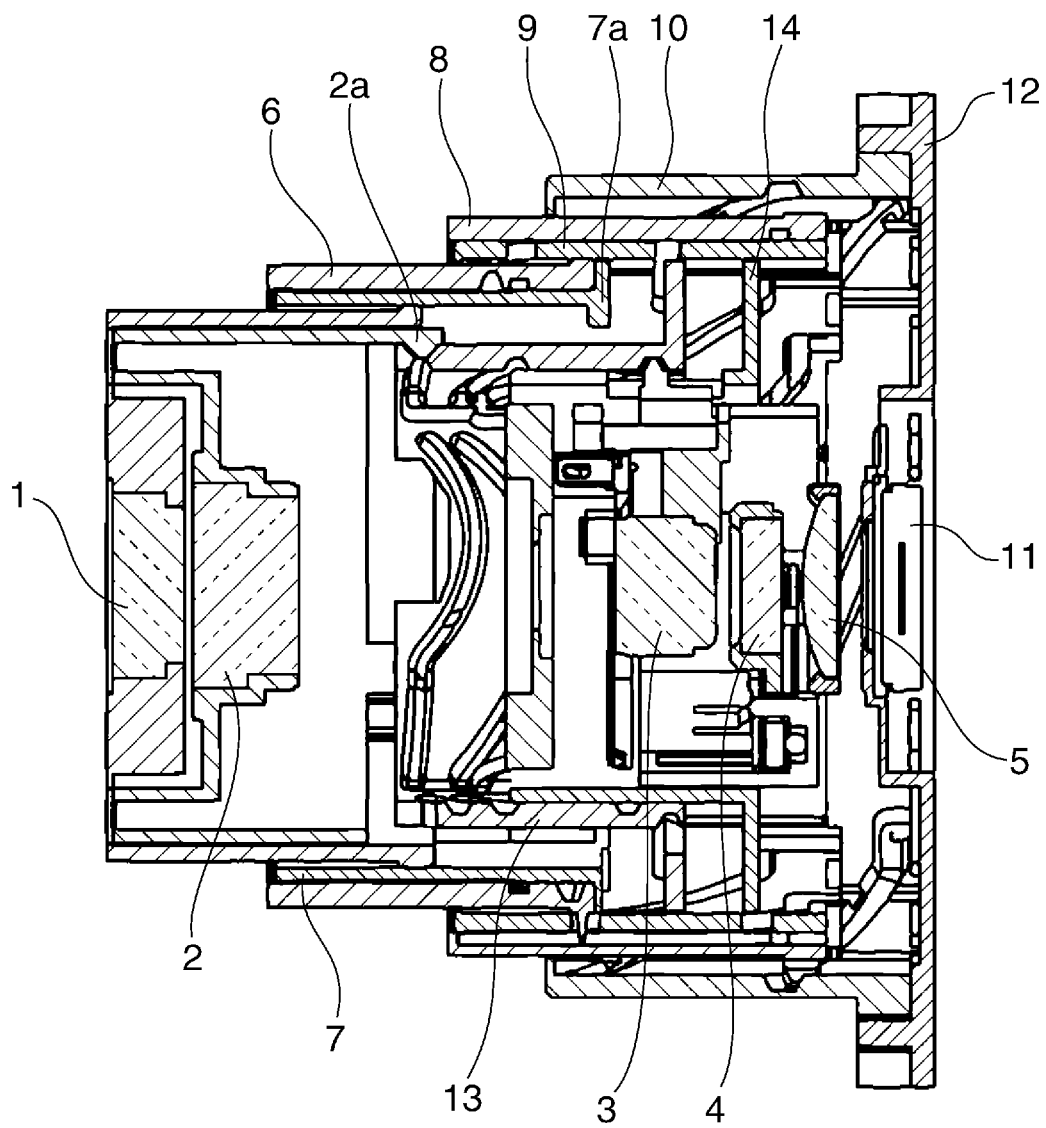
FIG. 4 is a cross-sectional view showing a lens barrel being at a wide position.
Figure 5:
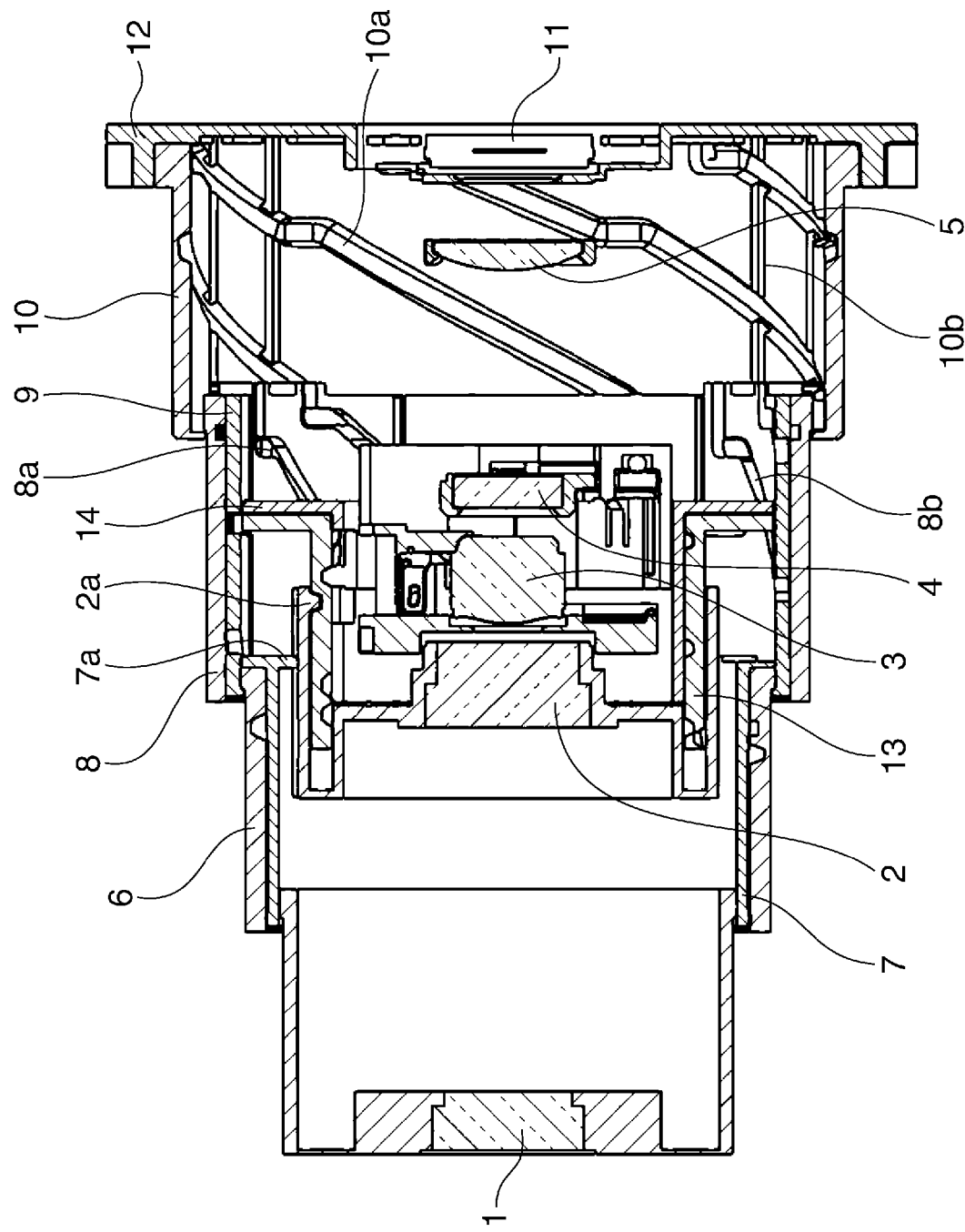
FIG. 5 is a cross-sectional view showing the lens barrel being at a telephoto position.
Figure 6:
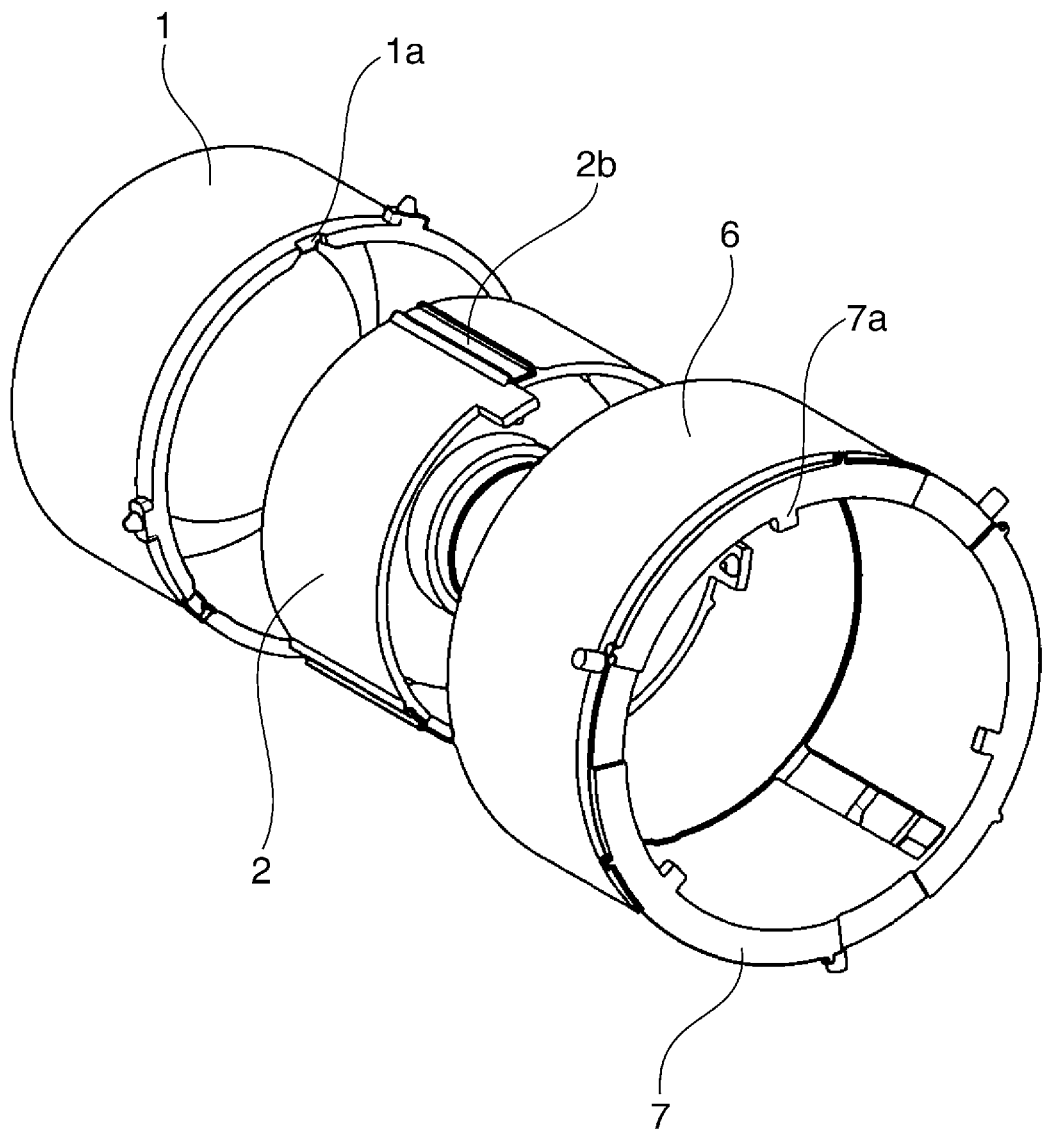
FIG. 6 is an exploded perspective view showing the relationship among a first lens unit, a second lens unit, and a first translating cylinder.

Referring next to FIGS. 4 to 6, a detailed description will be given of the lens barrel 30.

FIG. 4 is a cross-sectional view showing the lens barrel 30 being at a wide position, FIG. 5 is a cross-sectional view showing the lens barrel 30 being at a telephoto position, and FIG. 6 is an exploded perspective view showing the relationship among a first lens unit 1, a second lens unit 2, and a first translating cylinder 7.

As shown in FIGS. 4 and 5, the lens barrel 30 has the first lens unit 1 holding first group lenses, the second lens unit 2 holding second group lenses, and a third lens unit 3 holding third group lenses.

Also, the lens barrel 30 has a fourth lens unit 4 holding fourth group lenses and a fifth lens unit 5 holding fifth group lenses. The fifth group lenses of the fifth lens unit 5 are focus lenses.

A device holder 12 holds the image pickup device 11, and a fixed cam cylinder 10 is disposed on the subject side of the device holder 12.

A fixed cam groove 10a is formed on an inner peripheral portion of the fixed cam cylinder 10, and a follower pin of a second moving cam cylinder 8 following the fixed cam groove 10a is cam-engaged with the fixed cam groove 10a. The second moving cam cylinder 8 is rotatively driven, so that the follower pin follows the fixed cam groove 10a and moves in the direction of the optical axis while rotating with respect to the fixed cam cylinder 10.

A second translating cylinder 9 is disposed on an inner peripheral portion of the second moving cam cylinder 8, and the second translating cylinder 9 is bayonet-joined to the second moving cam cylinder 8 so as to be rotatable relatively to the second moving cam cylinder 8 and moves with the second moving cam cylinder 8 in the direction of the optical axis. A key groove joined to a translating key 10b provided on an inner peripheral portion of the fixed cam cylinder 10 is formed on an outer peripheral portion of the second translating cylinder 9, thus inhibiting the rotation of the second translating cylinder 9.

A first cam groove 8a is formed on an inner peripheral portion of the second moving cam cylinder 8, and a follower pin of the first translating cylinder 7 is cam-engaged with the first cam groove 8a.

A first moving cam cylinder 6 is disposed on an outer peripheral side of the first translating cylinder 7, and the first moving cam cylinder 6 is rotatably bayonet-joined to the first translating cylinder 7. The first translating cylinder 7 has a key groove that is joined to a translating key provided in the second translating cylinder 9, and thus, in the state of being inhibited from rotating, the first translating cylinder 7 can move in the direction of the optical axis relatively to the second moving cam cylinder 8 due to cam-engagement with the second moving cam cylinder 8.

The first moving cam cylinder 6 is key-joined to the second moving cam cylinder 8, and moves in the direction of the optical axis together with the first translating cylinder 7 while rotating with rotation of the second moving cam cylinder 8. A cam groove is formed on an inner peripheral portion of the first moving cam cylinder 6, and a follower pin of the first lens unit 1 following the cam groove is cam-engaged with the cam groove.

Thus, the rotation of the first moving cam cylinder 6 causes the first lens unit 1 to move in the direction of the optical axis. When the first lens unit 1 is moving in the direction of the optical axis, the first lens unit 1 is key-joined to the first translating cylinder 7, and hence the rotation thereof is inhibited. Here, the first moving cam cylinder 6 corresponds to an exemplary first cam member according to the present invention.

An inner cam cylinder 13 is disposed on an inner peripheral side of the second moving cam cylinder 8, and an inner translating cylinder 14 is disposed on an inner peripheral side of the inner cam cylinder 13.

The inner translating cylinder 14 is rotatably bayonet-joined to the inner cam cylinder 13. A second cam groove 8b is formed on an inner peripheral portion of the second moving cam cylinder 8, and a follower pin of the inner translating cylinder 14 following the second cam groove 8b is cam-engaged with the second cam groove 8b.

The inner translating cylinder 14 has a key groove that is engaged with a translating key provided in the second translating cylinder 9, and as a result, in the state of being inhibited from rotating, the inner translating cylinder 14 can relatively move in the direction of the optical axis relatively to the second moving cam cylinder 8 due to cam-engagement with the second moving cam cylinder 8.

The inner cam cylinder 13 is key-joined to the second moving cam cylinder 8, and moves in the direction of the optical axis together with the inner translating cylinder 14 while rotating with rotation of the second moving cam cylinder 8. Also, a cam groove followed by a follower pin 2a of the second lens unit 2 is formed on an outer peripheral portion of the inner cam cylinder 13, and cam grooves followed by respective follower pins of the third lens unit 3 and the fourth lens unit 4 are formed on an inner peripheral portion of the inner cam cylinder 13.

Thus, the rotation of the inner cam cylinder 13 causes the second lens unit 2, third lens unit 3, and fourth lens unit 4 to move in the direction of the optical axis. The third lens unit 3 and the fourth lens unit 4 are key-joined to the inner translating cylinder 14 and inhibited from rotating. Here, the inner cam cylinder 13 corresponds to an exemplary second cam member according to the present invention.

When the lens barrel 30 is extended from the wide position in FIG. 4 to the telephoto position in FIG. 5, the second lens unit 2 moves in a direction relatively away from the first lens unit 1.

At this time, the amount of the relative movement of the second lens unit 2 relative to the first lens unit 1 in the direction of the optical axis is particularly large as compared to the other lens units.

Here, referring to FIG. 6, at the wide position in FIG. 4, a translating groove 2b provided on an outer peripheral portion of the second lens unit 2 is engaged with a first guide projection 1a provided on an inner peripheral portion of the first lens unit 1 so as to linearly guide the second lens unit 2 while inhibiting the rotation thereof.

Also, at the telephoto position in FIG. 5, the translating groove 2b provided on the outer peripheral portion of the second lens unit 2 is engaged with a second guide projection 7a provided on an inner peripheral portion of the first translating cylinder 7. Here, the translating groove 2b and the first guide projection 1a correspond to an exemplary first linear guide unit according to the present invention, and the translating groove 2b and the second guide projection 7a correspond to an exemplary second linear guide unit according to the present invention.

While the lens barrel 30 is moving from the wide position in FIG. 4 to the telephoto position in FIG. 5, the translating groove 2b switches from the state of being engaged with the first guide projection 1a to the state of being engaged with the second guide projection 7a.

As a result, the relative movement interval of the first lens unit 1 and the second lens unit 2 in the direction of the optical axis can be increased without increasing the dimension of the first translating cylinder 7, which inhibits the rotation of the second lens unit 2, in the direction of the optical axis.

As described above, in the present embodiment, the stroke of the second lens unit 2 can be increased without increasing the dimension of the first translating cylinder 7 in the direction of the optical axis. As a result, the shooting magnification of the lens barrel 30 can be increased, while the slimming down of the digital camera 15 can be realized by decreasing the dimension of the lens barrel 30 in the direction of the optical axis when the lens barrel is retracted.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-021613 filed Feb. 3, 2011, which is hereby incorporated by reference herein in its entirety.

What is claimed is:

1. A lens barrel comprising:
   a first lens unit configured to hold a first lens group;
   a second lens unit configured to hold a second lens group;
   a first cam member with which said first lens unit is cam-engaged and which is configured to rotate to move said first lens unit in a direction of an optical axis;
   a second cam member with which said second lens unit is cam-engaged and which is configured to rotate to move said second lens unit in the direction of the optical axis;
   a translating cylinder configured to inhibit rotation of said first lens unit;
   a first translating guide unit provided between said first lens unit and said second lens unit, and configured to linearly guide said second lens unit in the direction of the optical axis while inhibiting rotation of said second lens unit; and
   a second translating guide unit provided between said second lens unit and said translating cylinder, and linearly guide said second lens unit in the direction of the optical axis while inhibiting rotation of said second lens unit,
   wherein linear guide by said first translating guide unit is switched to linear guide by said second translating guide unit when said second lens unit moves in a direction relatively away from said first lens unit.

2. A lens barrel according to claim 1, wherein:
   said first translating guide unit comprises a first guide projection that is provided on an inner periphery of said first lens unit, and a translating groove that is provided on an outer periphery of said second lens unit to engage the first guide projection, and
   said second translating guide unit comprises the translating groove and a second guide projection that is provided on an inner periphery of said translating cylinder and engages said translating groove.

3. An image pickup apparatus comprising:
   an image sensing device; and
   a zoom-type lens barrel that changes shooting magnifications by moving in the direction of an optical axis of the image pickup apparatus between a shooting position and a retracting position,
   wherein the zoom-type lens barrel includes:
   a first lens unit configured to hold a first lens group;
   a second lens unit configured to hold a second lens group;
   a first cam member with which said first lens unit is cam-engaged and which is configured to rotate to move said first lens unit in a direction of an optical axis;
   a second cam member with which said second lens unit is cam-engaged and which is configured to rotate to move said second lens unit in the direction of the optical axis;
   a translating cylinder configured to inhibit rotation of said first lens unit;
   a first translating guide unit provided between said first lens unit and said second lens unit, and configured to linearly guide said second lens unit in the direction of the optical axis while inhibiting rotation of said second lens unit; and a second translating guide unit provided between said second lens unit and said translating cylinder, and configured to linearly guide said second lens unit in the direction of the optical axis while inhibiting rotation of said second lens unit, wherein linear guide by said first translating guide unit is switched to linear guide by said second translating guide unit when said second lens unit moves in a direction relatively away from said first lens unit.

4. A lens barrel comprising:

a first lens unit configured to hold a first lens group;

a second lens unit configured to hold a second lens group;

a first cam member with which said first lens unit is cam-engaged and which is configured to rotate to move said first lens unit in a direction of an optical axis;

a second cam member with which said second lens unit is cam-engaged and which is configured to rotate to move said second lens unit in the direction of the optical axis;

a translating cylinder configured to inhibit rotation of said first lens unit;

a first translating guide unit provided between said first lens unit and said second lens unit, and configured to linearly guide said second lens unit in the direction of the optical axis while inhibiting rotation of said second lens unit; and a second translating guide unit provided between said second lens unit and said translating cylinder, and configured to linearly guide said second lens unit in the direction of the optical axis while inhibiting rotation of said second lens unit, wherein said first lens unit and said second lens unit are displaceable along the direction of the optical axis between a first position where said first lens unit and said second lens unit are closest to each other and a second position where said first lens unit and said second lens unit are farthest from each other, wherein said first translating guide unit linearly guides said second lens unit to the first position, and wherein said second translating guide unit, instead of said first translating guide unit, linearly guides said second lens unit to the second position.

5. A lens barrel according to claim 4, wherein:

said first translating guide unit comprises a first guide projection that is provided on an inner periphery of said first lens unit, and a translating groove that is provided on an outer periphery of said second lens unit to engage the first guide projection, and said second translating guide unit comprises the translating groove and a second guide projection that is provided on an inner periphery of said translating cylinder and engages said translating groove.

6. An image pickup apparatus comprising:

an image sensing device; and a zoom-type lens barrel that changes shooting magnifications by moving in the direction of an optical axis of the image pickup apparatus between a shooting position and a retracting position, wherein the zoom-type lens barrel includes:

a first lens unit configured to hold a first lens group;

a second lens unit configured to hold a second lens group;

a first cam member with which said first lens unit is cam-engaged and which is configured to rotate to move said first lens unit in a direction of an optical axis;

a second cam member with which said second lens unit is cam-engaged and which is configured to rotate to move said second lens unit in the direction of the optical axis;

a translating cylinder configured to inhibit rotation of said first lens unit;

a first translating guide unit provided between said first lens unit and said second lens unit, and configured to linearly guide said second lens unit in the direction of the optical axis while inhibiting rotation of said second lens unit; and a second translating guide unit provided between said second lens unit and said translating cylinder, and configured to linearly guide said second lens unit in the direction of the optical axis while inhibiting rotation of said second lens unit, wherein said first lens unit and said second lens unit are displaceable along the direction of the optical axis between a first position where said first lens unit and said second lens unit are closest to each other and a second position where said first lens unit and said second lens unit are farthest from each other, wherein said first translating guide unit linearly guides said second lens unit to the first position, and wherein said second translating guide unit, instead of said first translating guide unit, linearly guides said second lens unit to the second position.

* * * * *